Sept. 15, 1942.　　　H. G. MUELLER　　　2,295,962
MULTIPLE CYLINDER STEAM ENGINE AND VALVE GEAR THEREFOR
Filed Oct. 27, 1941　　　6 Sheets-Sheet 6
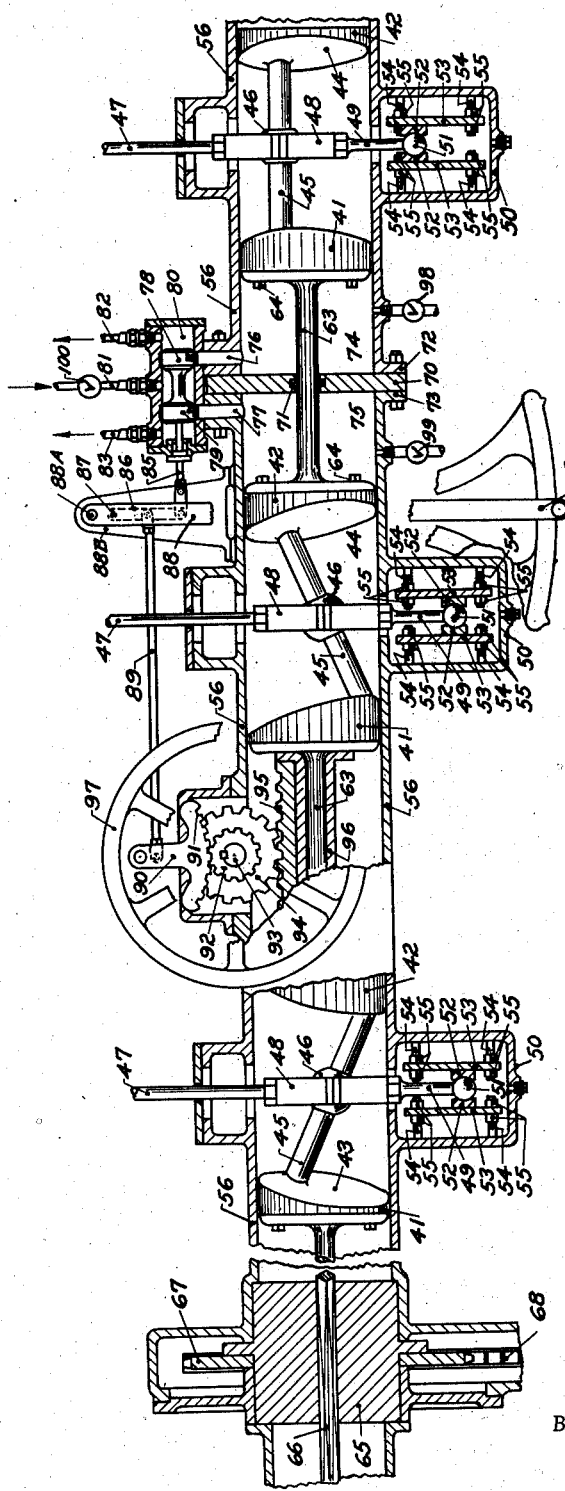
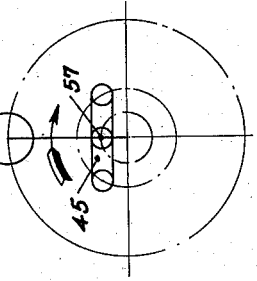
FIG. 15.
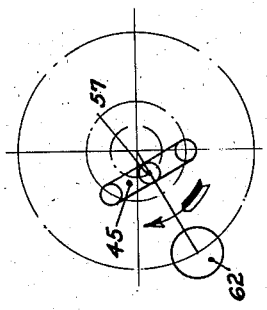
FIG. 14.
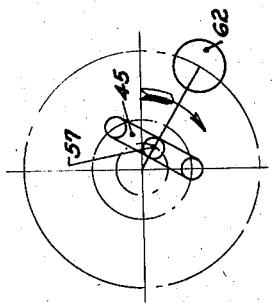
FIG. 13.
INVENTOR.
HERMAN G. MUELLER
BY
Florean G. Miller
Atty.

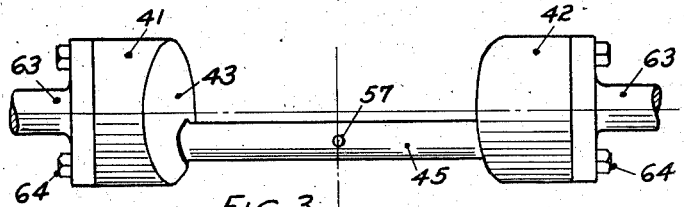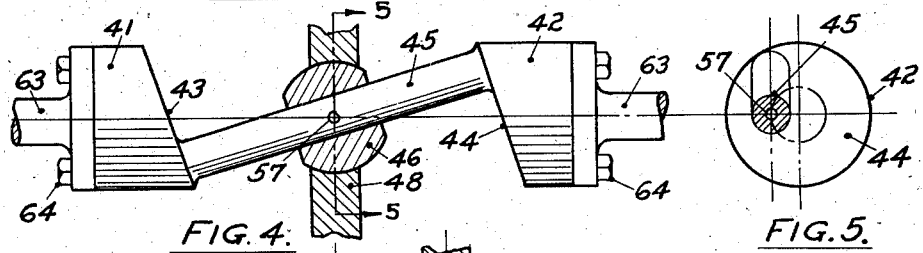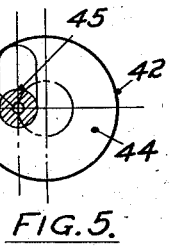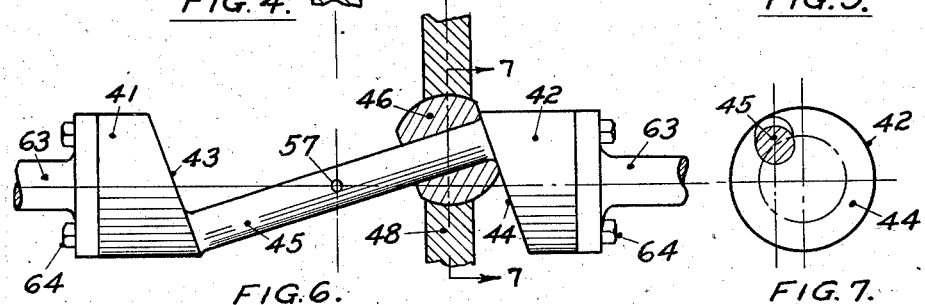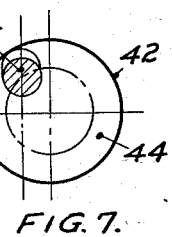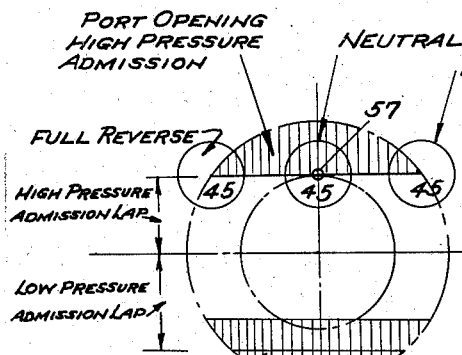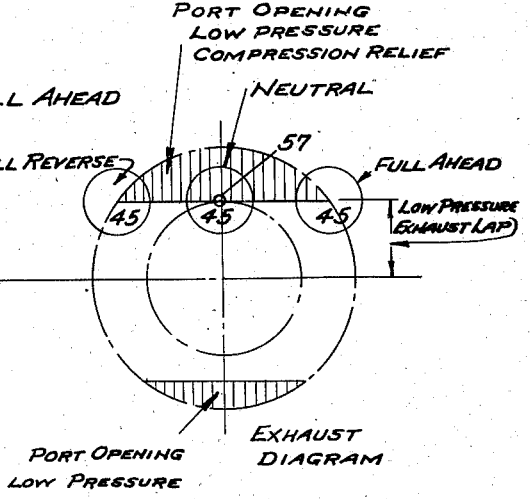

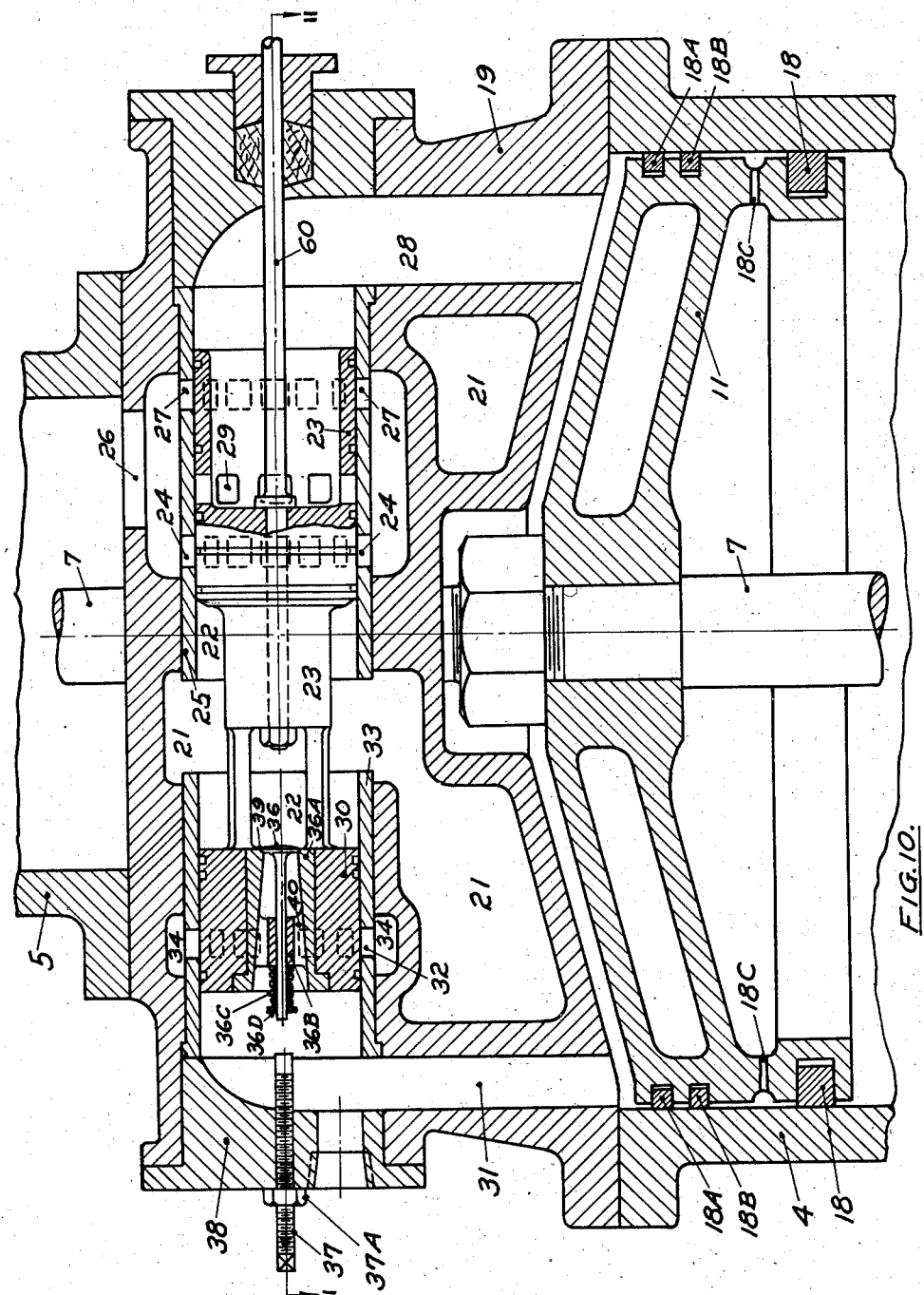

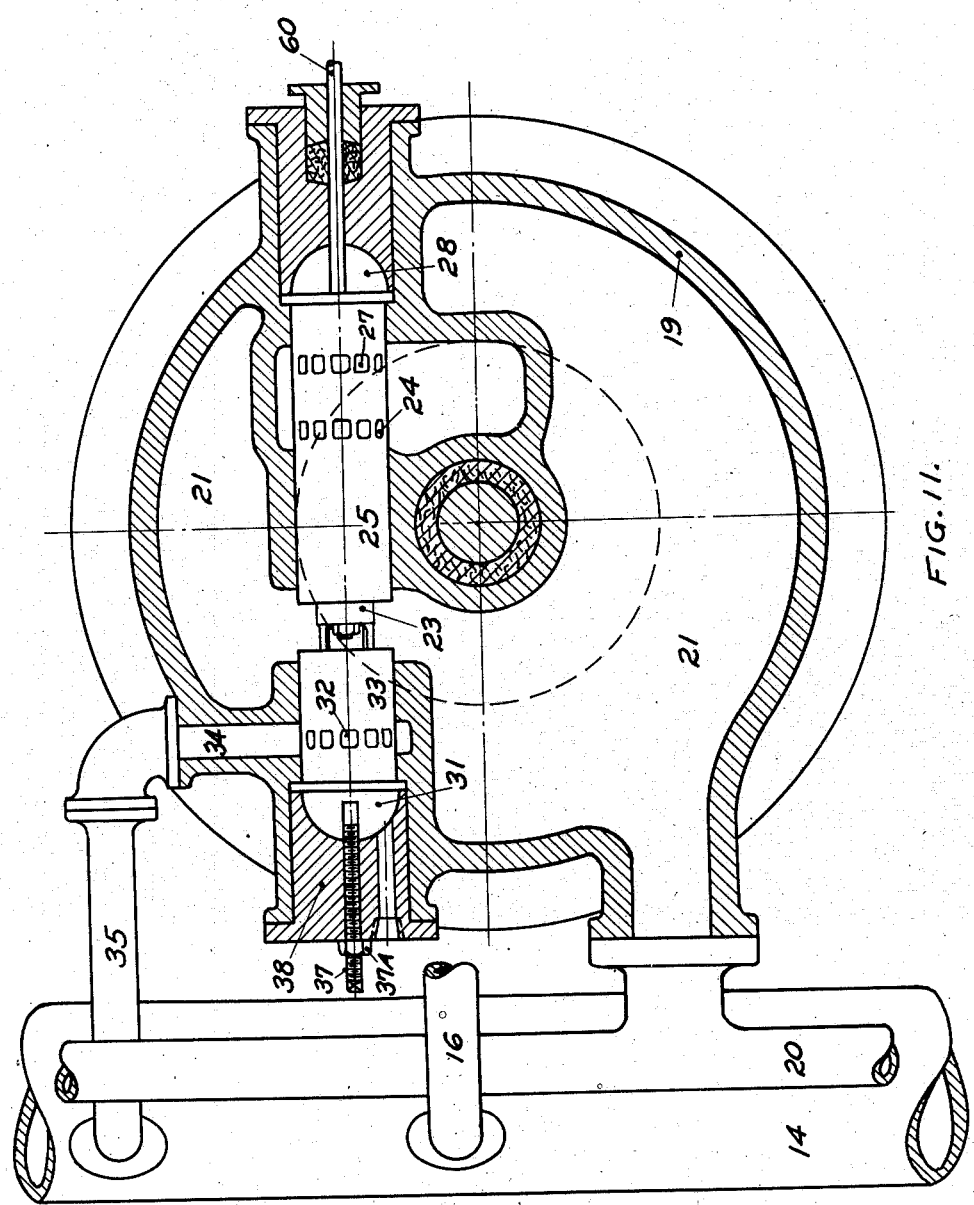

Patented Sept. 15, 1942

2,295,962

UNITED STATES PATENT OFFICE 2,295,962

MULTIPLE CYLINDER STEAM ENGINE AND VALVE GEAR THEREFOR

Herman G. Mueller, Erie, Pa., assignor to Ajax Iron Works, Corry, Pa., a corporation of Pennsylvania Application October 27, 1941, Serial No. 416,630

28 Claims. (Cl. 121—103)

This invention relates generally to multi-cylinder, vertical, enclosed forced-feed lubricated, "Woolf cycle," steeple compound, uniflow, reversing, stationary or marine, steam engines of the single-acting type, and a novel valve gear therefor.

Simple and multiple expansion steam engines, most of which are of the double-acting type and with which I am familiar, have cylinder lubrication difficulties, particularly when used with high-pressure and high-temperature steam which maintains the cylinder walls, piston rings, and piston rods at high temperatures. This requires excessive amounts of cylinder oil, much of which becomes highly emulsified in the steam passing through the engine, whence it passes into the condenser where the steam is condensed with the emulsified oil, contaminating the condensate which is returned to the boilers. The oil accumulates in the boilers as the water is evaporated, and usually causes serious trouble.

In the conventional, double-acting engines, the piston rod contacts the high-temperature steam, and in simple uniflow engines, it passes, in addition, through the lower jacketed cylinder head containing steam at full initial temperature, thus heating the rod further to higher temperatures. The rod then passes through the packing box into the crank case where it contacts the air and engine oil and causes carbonizing of the packing case and packing rings, which frequently becomes very troublesome.

Where the "Woolf cycle" has been used on double-acting compound engines with a single-piston valve per pair of cylinders, excessive valve diameters have been necessary with a single-ported valve in order to provide the required port area for the large exhaust volume to be handled between the high-pressure and low-pressure cylinders. Double-porting both of the exhaust ends of this valve on a double-acting engine would entail excessive valve length and numerous additional valve rings, thus making an impractical valve with high frictional resistance and requiring excessive actuating forces.

In a double-acting engine, it is not practical to provide automatic high-pressure admission to the low-pressure cylinder for starting, and this is accomplished only through hand-operated by-pass valves.

The valve gears conventionally used have been of the reciprocating, eccentric and link type, requiring a complete gear for each cylinder, and these do not lend themselves to multi-cylinder, enclosed engines and, also, are notably defective in providing proper valve motion to obtain steam events at short cut-offs and do not give a perfect neutral.

Conventional, double-acting, steeple compound engines require excessive headroom which would be further increased by the use of a double-acting, uniflow, low-pressure cylinder, due to the long piston typical of such a cylinder.

It is accordingly an object of my invention to overcome the above and other defects in multi-cylinder steam engines, and it is more particularly an object of my invention to provide a compound, uniflow, multi-cylinder, reversing, steam engine which is simple in construction, efficient in operation, and economical in cost of manufacture.

Another object of my invention is to provide a steeple compound, uniflow engine which requires a minimum of headroom.

Another object of my invention is to provide a compound, uniflow, steam engine which has low-compression ratios with resulting low-compression temperature, by providing an automatic compression relief without the use of an additional valve.

Another object of my invention is to provide a compound steam engine operating with comparatively low cylinder-wall temperatures.

Another object of my invention is to relieve cylinder lubrication difficulties by a vacuum on one side of both pistons, thus reducing the cylinder-wall temperatures and the amount of lubrication necessary.

Another object of my invention is to provide novel lubricating means in a compound, single-acting, multi-cylinder, steam engine.

Another object of my invention is to provide improved valve means for admitting and exhausting steam to and from the high-pressure cylinders and to and from the low-pressure cylinders in a compound, multi-cylinder steam engine.

Another object of my invention is to provide a novel valve gear for a multi-cylinder, steam engine to give suitable motion to the valves without the use of links, eccentrics, rods or the like, and which can operate any number of cylinders in line and with any crank relationship.

Another object of my invention is to provide a valve for a multi-cylinder engine which is single-ported for high-pressure admission and double-ported for exhausting the steam to the low-pressure cylinder.

Another object of my invention is to provide a valve gear which is entirely enclosed and forced-feed lubricated.

Another object of my invention is to provide a simple valve gear which will give proper steam events at short cut-offs and a perfect neutral.

Another object of my invention is to provide a single-acting engine in which the high-temperature steam does not contact that portion of the piston rod which enters the crank case.

Another object of my invention is to provide a multi-cylinder, compound, steam engine in which the reciprocating parts of all cylinders are interchangeable duplicates and which gives balanced reciprocating weights.

Other objects of my invention will become evident from the following detailed description taken in conjunction with the accompanying drawings, in which:

Fig. 1 is a vertical, cross-sectional view through the center line of one of the high and low-pressure cylinders, of my novel multi-cylinder, compound engine.

Fig. 1—A is an enlarged, fragmentary view of that portion of Fig. 1 showing the high-pressure piston.

Fig. 3 is a top fragmentary plan view of a principal portion of my novel valve gear.

Fig. 4 is a fragmentary, side-elevational view of the same principal portion of my novel valve gear shown in Fig. 3.

Fig. 5 is a sectional view taken on the line 5—5 of Fig. 4.

Fig. 6 is a fragmentary, side-elevational view of my novel valve gear similar to that shown in Fig. 4 with the slidable member on the crank pin in an end position where it circumscribes a maximum diameter.

Fig. 7 is a sectional view taken on the line 7—7 of Fig. 6.

Fig. 8 is a steam admission diagram of my novel expansion steam engine.

Fig. 9 is an exhaust diagram of my novel multi-cylinder, compound, steam engine.

Fig. 10 is a vertical, fragmentary section taken through my novel valve, cylinder head, and low-pressure piston for my novel multi-cylinder, compound, steam engine.

Fig. 11 is a horizontal section taken on the line 11—11 of Fig. 1 and Fig. 10.

Fig. 12 is a vertical, longitudinal section through my novel valve gear, the chain drive for rotating it, and the control mechanism therefor.

Figs. 13, 14, and 15 are diagrams showing the angular relationship between the main crank pin and the corresponding valve gear crank pin for each of the cylinders shown in my novel multi-cylinder engine.

Figure 1:
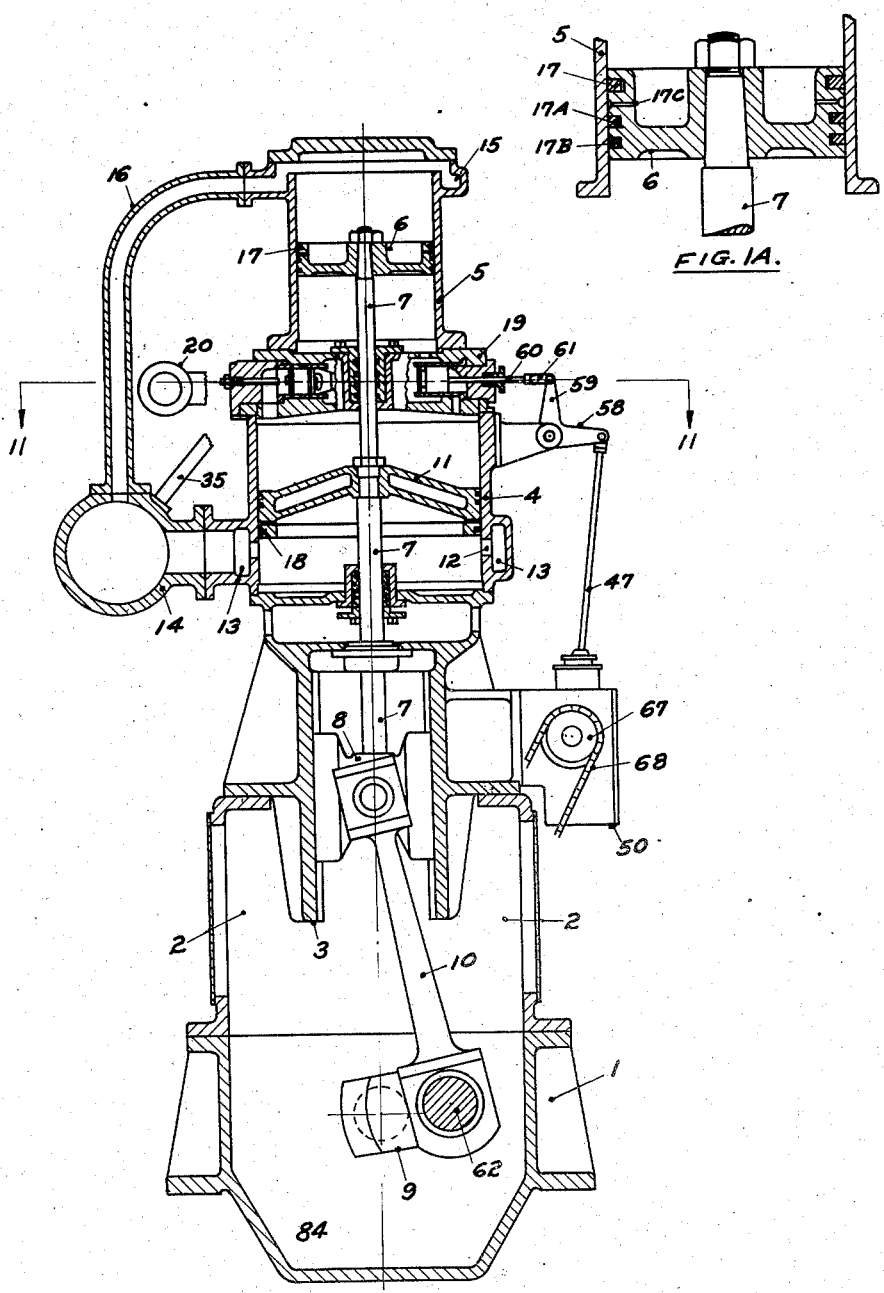
Figure 2:
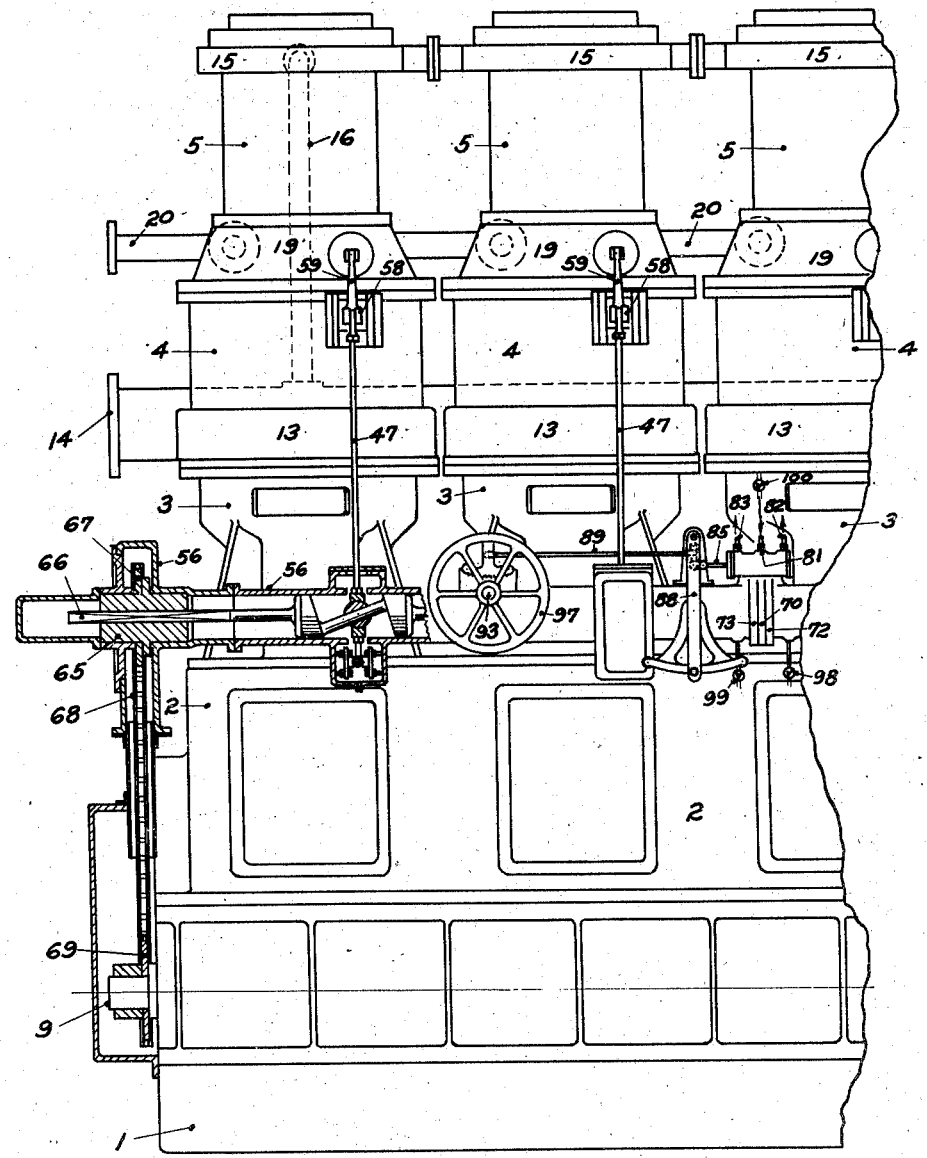
Fig. 2 is a side-elevational view with parts thereof broken away, of my novel multi-cylinder, compound, steam engine.

Referring now to the drawings, Figs. 1 and 2 show a bed 1, a frame 2, guide members 3, low-pressure cylinder 4, and high-pressure cylinders 5 of my novel multi-cylinder, compound, steam engine. The high-pressure cylinder 5 has a short piston 6 disposed therein, mounted on piston rod 7 which extends downwardly through the low-pressure cylinder 4 to cross-head 8 which imparts motion to the crank 9 through the connecting rod 10 connected to the cross-head 8 and crank 9 respectively. The piston rod 7 has a short piston 11 mounted thereon and movable in the low-pressure cylinder 4. The low-pressure cylinder 4 has ports 12 in the lower portion thereof leading into an exhaust chamber 13 surrounding the lower portion of the low-pressure cylinder 4. The exhaust passes from the chamber 13 to the comparatively large size exhaust line 14 which leads to a condenser (not shown). The low-pressure cylinder 4 has approximately five times the displacement of the high-pressure cylinder 5. The high-pressure cylinder 5 is of the counter-flow type. The upper side of the high-pressure piston 6 and the lower side of the low-pressure piston 11 are vented to the condenser at the vacuum pressure of the condenser, giving a breather action at low steam densities. The low-pressure cylinder 4 is vented through the uniflow ports 12 which have ample capacity for venting the steam under the large low-pressure piston 11. The high-pressure cylinder 5 is vented through the manifold 15, interconnecting all the high-pressure cylinders 5, and this manifold 15 is vented to the condenser through the exhaust pipes 16 and 14. The piston 11 in the low-pressure cylinder 4 is of very short length because it is single-acting and therefore does not require the long piston typical of the double-acting, uniflow engine.

With this arrangement, each pair of high-pressure and low-pressure cylinders constitutes a complete compound engine and can be built in any number of double cylinders, giving balanced reciprocating weights. This is different from the conventional, double-acting, compound engine which is limited to a minimum of two cylinders and is usually built with four cylinders with more or less unbalanced weights and requiring the development of several different sizes of bores and strokes for the same range of horse powers which can be accomplished with one development on my novel engine by varying the number of cylinders.

Due to the short piston in the low-pressure cylinder 4, the height or headroom required for my novel engine is only a few inches more than that of a double-acting, long-piston, uniflow, low-pressure or simple uniflow cylinder of equal stroke.

It is well known that lubrication of marine cylinders, especially the uniflow type, where higher pressures and temperatures are used, is difficult and causes considerable trouble because of the high temperatures generated in the cylinder which highly emulsifies the cylinder oil, thereby causing great difficulties in removing it before it passes to the feed system and the boilers. By compounding the cylinders, as in my novel multiple-cylinder, compound, steam engine, the range of steam-pressure drop and steam-temperature drop per cylinder is much less than it is in a simple uniflow engine, thus materially reducing the degree of oil emulsification. The breather action on the one side of each piston with comparatively cool steam at the low condenser pressure, tends to reduce the cylinder-wall temperatures except at a point close to the cylinder head where cooling would be thermodynamically detrimental. I insert floating rings 17 and 18, made of graphite, carbon, micarta or any other material having lubricating qualities, on the vacuum side of the pistons 6 and 11 respectively, which act as lubricating swabs on the inner walls of the cylinders 5 and 4, thereby materially reducing the amount of cylinder oil necessary when superheated steam is used, and I eliminate cylinder-wall lubrication entirely when saturated steam is used. As compared with simple, uniflow engines, the compound cycle, as shown, has much lower compression ratios resulting in moderate compression temperatures which, in a simple, uniflow engine, may reach to over 1000° Fahrenheit. By eliminating these in the compound cycle, cylinder lubrication is thus further simplified.

The use of lubricating rings is practical only on my novel engine, due to the fact that these rings 17 and 18 are carried on the vacuum side of the pistons 6 and 11 and subjected to low vacuum pressures. Any leakage from the pressure-carrying rings 17—A, 17—B, 18—A and 18—B is vented to the vacuum through vent holes 17—C and 18—C (Figs. 1, 1—A and 10). On any other double-acting pistons, such lubricating rings, which are usually of comparatively soft and fragile materials, would be subjected to full cylinder pressure which would wear them out more rapidly than would be permissive in practice.

It will further be evident that the construction of my novel engine eliminates a hot piston rod passing into a crank case, which condition is always present on any double-acting engine and causes trouble due to carbonizing of the rod packing cases. In my novel engine, the piston rod 7 extending below the low-pressure piston 11 travels in a vacuum and operates at vacuum temperature which is approximately equal to the crank case temperature. This temperature is always below that which will cause the oil to carbonize.

The high-pressure steam is carried to each cylinder head 19 by a common welded expansion compensating steam manifold 20, then to a steam jacket or reservoir 21 in the head which serves to reheat the steam passing from the high-pressure cylinder 5 to the low-pressure cylinder 4 and, also, to keep the working ends of each cylinder at economically high temperatures (Figs. 1 and 10). The steam flows from the cylinder jacket 21 to the middle chamber 22 of a piston valve 23 which is of the inside steam type. When the valve 23 moves to the right, steam is admitted to the high-pressure cylinder 5 through the apertures 24 in the bushing 25 and through the passage 26, forcing the piston 6 upwardly in the cylinder 5. When the piston 6 reaches the top of the stroke, the valve 23 will have moved to the right and back again to the left to a position whereby the two apertures 24 and 27 in the bushing 25 and the apertures 29 in the valve 23 are opened, thus venting the high-pressure cylinder to the low-pressure cylinder through the passages 26 and 28. It will be noted that only apertures 24 are open for high-pressure admission to the high-pressure cylinder 5, and the two apertures 24 and 27 are opened for exhausting the steam in the high-pressure cylinder to the low-pressure cylinder 4. The reason for this is the fact that the port capacity required for exhausting the expanded steam in the high-pressure cylinder 5 into the low-pressure cylinder 4 is practically twice that required for admission of the high-pressure steam to the high-pressure cylinder 5. In single-valve, "Woolf Cycle," compound, steam engines now in use, an excessively large oversized valve is necessary to give a needed exhaust capacity of the steam passing from the high-pressure cylinder 5 to the low-pressure cylinder 4.

When the steam has been admitted to the low-pressure cylinder 4 with the piston 11 therein at the top of the stroke, the piston 11 is forced downwardly. As long as the intercommunicating openings 24, 26, 27, 28 and 29 between the high-pressure cylinder 5 and the low-pressure cylinder 4 are free to allow the intercommunication of steam, the pressure in the two cylinders is equalized. Since the displacement of the low-pressure piston 11 is approximately five times that of the high-pressure piston 6, expansion takes place in both cylinders; that is, the pressure is falling during this portion of the steam cycle. At approximately one-half stroke downwardly of the piston 11 in the low-pressure cylinder 4, the valve 23 closes the apertures 24, 27 and 29 and compression begins in the high-pressure cylinder 5 and further expansion takes place in the low-pressure cylinder 4 down to a point near the end of the stroke whereupon the uniflow ports 12 are uncovered by the piston 11 and the steam in the low-pressure cylinder 4 is exhausted through these ports 12 to the condenser. After passing the lower dead center and after the closure of the uniflow ports 12 by the low-pressure piston 11, compression occurs in the low-pressure cylinder 4.

It will be evident that nearly full-stroke compression upon the low-pressure piston 11 would make starting of the engine difficult and uneven. To eliminate this objection, a cylinder head 19 is provided with an auxiliary exhaust passage 31 for the low-pressure piston 11 so that on the low-pressure compression stroke, at which time the valve 23 and piston or spool 30 have again moved to the right, the apertures 32 in bushing 33 are open, relieving the compression through passage 31, apertures 32, passage 34, and through an additional outlet 35 to the condenser. In addition, piston or spool 30 is fitted with a small, spring-urged, single-seated, poppet valve 36, cage 36—A, guide 36—B and spring 36—C and washer 36—D which, when the valve 23 is in extreme long travel, engages an adjustable pin 37 with locknut 37—A screwed in through a bonnet 38 at the left end of the valve housing bore. This pin 37 is adjusted to engage the valve 36 and lift it from its seat 39 when the valve 23 is in extreme left-most position and extreme long travel. At this point, it will admit high-pressure steam from chamber 21, to the low-pressure cylinder 4 through passages 40 and 31, for starting purposes. This is especially desirable on tug boats and other boats where much maneuvering and reversing must be done. This valve 36 can be adjusted to function only at slightly over normal travel. On a trans-Atlantic ship which may run for a week or more constantly, the valve 36 will not be required except in harbor maneuvering, at which time it can be adjusted by movement of the pin 37. This valve 36 would only be needed with a two, or possibly three cylinder engine where there are not sufficient high-pressure cylinder steam impulses per revolution to entirely eliminate a dead center position. With a greater number of cylinders this valve is not necessary, but since a feature of this engine is flexibility and variation in the number of cylinders, this valve 36 is an important part of the construction of this engine when two or three cylinders are required. The reason for using a small, single-seated poppet valve is because such a valve is known to be especially steam tight and the capacity of this valve 36 need obviously be only very small. And, furthermore, it is only engaged when starting the engine with valve 23 moving in extreme maximum travel, at which time the steam pressure is throttled, and thus the valve 36 does not lift against high steam pressure. The degree of opening of the valve 36 is adjusted by longitudinal movement of the pin 37 externally of the engine, and by adjusting the amount of travel of the valve 23.

The construction of the piston valve 23 is such that the pressures acting on it are equalized on both ends which are vented through passages 28 and 31 to the low-pressure cylinder 4. The only unbalance is that of the stem area working against the reduced pressure in the low-pressure cylinder 4.

This engine uses an enclosed crank case, forced-feed lubricated, which will further assist in complete lubrication of the engine and its working parts.

Further, I have developed a novel type of valve gear to supply suitable motion to any form of slide valve, preferably the balanced piston valve as shown in my construction. My novel valve gear eliminates the use of conventional links, eccentrics, and rods such as are used on Stephenson and Walscheart's gears of which a complete set would be required for each valve. My novel valve gear can operate practically any number of cylinders in line and with any crank relationship. My novel valve gear is particularly shown in Figs. 2 to 9 and 12 to 15 inclusive, and comprises one or a series of opposed hubs 41 and 42 with the inner faces 43 and 44 thereof being interconnected by an angularly-disposed crank pin 45 spaced from the axial center line of the hubs 41 and 42. A slidable, spherical-shaped member 46 is slidably mounted on the crank pin 45 and is connected to a rod 47 by a strap member 48.

The lower end of strap 48 is fitted with and secured to a ball pin 49 projecting into a lower housing 50. On either side of the ball 51 is fitted a thrust shoe 52 with a spherical concave bearing surface on the inner side, engaging the ball 51, and a flat bearing surface on the outer side, engaging flat bearing plates 53, adjustably mounted on studs 54 screwed securely into housing 50 and locked with nuts 55. The purpose of this thrust bearing arrangement is to limit the motion of the strap 48 and the spherical-shaped member 46 to a circular motion in a vertical plane perpendicular to the center line through hubs 41 and 42 and to take the horizontal thrust reactions on these members caused by the angular disposition of crank pin 45.

To transmit the crank pin motion to the valve 23, one end of the rod 47 is connected to the spherical-shaped member 46 through the strap member 48 and the opposite end of the rod is connected to the horizontal arm 58 of a bell crank mounted on the side of the low-pressure cylinder 4, the vertical arm 59 of the bell crank being connected to the valve stem 60 through a suitable link 61.

The crank of one cylinder is connected to the crank of an adjacent cylinder by a flanged torque shaft 63 connected to the hubs 41 and 42 by suitable flanges and screw bolts 64. The whole assembly is rotated by a splined hub 65 mounted in one end of the bored housing 56 and through which extends a splined shaft 66 connected to the nearest crank hub 41. The hub 65 is fitted with a chain sprocket 67 which is engaged by a sprocket chain 68 to a similar sprocket 69 on the main crank shaft 9 with a one to one ratio. This arrangement provides the necessary rotary motion to the valve crank assembly and with proper timing of the driving and driven sprockets and the proper angular relationships between the valve gear cranks from one cylinder to the next and which angular spacing will be the same as that of the main shaft crank pins, the proper motion is provided for each steam valve.

The hubs 41 and 42 rotate in a bored housing 56 mounted on the side of the engine which is entirely enclosed, partially filled with oil, and forced-feed lubricated. The midpoint 57, (Figs. 3 to 9) of the crank pin 45 travels on a diameter equal to the minimum movement or short travel of the piston valve 23 which then opens the admission port 24 only as much as the lead opening which may be zero, thereby admitting no steam to the cylinders, and this point on the crank pin 57 is exactly in phase with the main crank pin 62 of the engine. It will be seen that when the midpoint 57 of the crank pin 45 is on head end dead center, the main crank pin 62 is also on head end dead center. When the valve crank assembly, members 41, 45 and 42, is moved longitudinally, the spherical-shaped member 46 moves along relative to the pin 45, thereby increasing the radius of the circle which it is circumscribing, and also the angular relation to the main crank pin 62 is such as to give constant lead opening (see Figs. 8 and 9), and the valve travel will also be increased in proportion to the diameter of the circle circumscribed by the spherical member 46. At any intermediate point between the middle and extreme end of the crank pin 45, various cut-offs and port openings may be obtained from a minimum of zero at the center point 57 of the crank pin 45 to a maximum at either extreme end of the pin 45. The maximum can be made suitable for the particular application where it is to be used, and it may be as much as 80% or 90% cut-off, or it can be limited to 50% or 60% or less as may be preferred. Many variations may be obtained by variation in the design of the length of the crank pin 45, the exhaust and steam laps on the valve 23, the angular relation of the crank pin 45 to the centerline of the hubs 41 and 42, and minimum and maximum travel diameter of the spherical-shaped member on the crank pin, all in proper desired proportion. The crank assembly is moved longitudinally in one direction for ahead rotation and in the opposite direction for astern rotation.

With this construction, exactly equal events are obtained ahead or astern. Accurate cut-off is obtained down to zero and a so-called "shoestring" or friction card can be obtained with 1% or 2% cut-off and full steam pressure on the engine. The lead port opening is constant for all cut-offs and can be varied by changing the lap on the valve 23 and the same can be done with the exhaust end of the valve 23 for lead in the low-pressure cycle.

Longitudinal movement of the assembled cranks of my novel valve gear is obtained by introducing a split dividing plate 70 with an oil seal packing ring 71 surrounding the torque shaft 63 and mounted between flanges 72 and 73 of bored housings 56. Oil chambers 74 and 75 are formed on each side of the plate 70 with oil passages 76 and 77 leading thereto. Two interconnected pistons 78 and 79 moving in a bore 80 close the oil passages 76 and 77 and prevent oil passing thereto from the feeding oil line 81 leading to a pump (not shown) operated independently of the engine. The two interconnected pistons 78 and 79 also prevent oil draining from chambers 74 and 75 through passages 76 and 77 to the drain connections 82 and 83 which lead back to the main engine crank case 84 from whence the oil may drain back to the pump (not shown). The pistons 78 and 79 are moved longitudinally in the bore 80 by a rod 85 connected to a link 86 pivoted at 87 on the control handle 88. The control handle 88 is pivoted at 88—A in the fixed bracked 88—B. A reach rod 89 has one end thereof pivotally secured to the midpoint of the link 86 and the opposite end of the rod 89 is connected to a rocker member 90 having an arc-shaped rack portion 91 which engages a pinion 92 keyed on pinion shaft 93, carrying pinion gear 94 in engagement with a rack 95 mounted on a bearing sleeve 96 riding on torque shaft 63. The rack 95 is not rotatable with the hubs 41 and 42.

As shown in Figs. 2 and 12, a handwheel 97, mounted on the pinion shaft 93, is provided for manually moving the cranks longitudinally. Small cocks 98 and 99 in communication with the oil chambers 74 and 75 permit removal of the oil from these chambers when manual operation is desired. A valve 100 is provided to cut off the oil supply 81 to the pistols 78 and 79.

An examination of the diagrams in Figs. 8 and 9 sets forth graphically the steam events of my engine.

In operation, the control lever 88 may be moved to the right or left. For the purpose of illustration, I will describe a movement of the control lever to the right to move the valve cranks to the left. Upon movement of the control lever 88 to the right, the link 86 swivels on its center, since the rod 89 is as yet stationary, thus moving the lower portion of the link 86 to the left which moves the pistons 78 and 79 to the left, thereby opening oil passage 77 and allowing oil to pass from the supply line 81 to the oil cylinder 75 and opening oil passage 76 to drain line 82. The greater pressure in oil cylinder 75 exerts a pressure on hub 42 and moves the cranks to the left. The rack 95 then moves the pinions 94 and 92 clockwise, thereby moving the arc-shaped rack 91 in engagement therewith to the right. The rocker 90, therefore, moves the reach rod 89 to the right which, in turn, pushes the lower portion of the link 86 to the right with the rod 85 and pistons 78 and 79 connected thereto moving to the right therewith. This movement of the pistons 78 and 79 continues to the right until the oil passages 76 and 77 leading to the oil chambers 74 and 75 are closed, thereby automatically locking the longitudinal position of the cranks at a point governed by the predetermined position of the control lever. It will be evident from this description that the control lever 88 may be moved to the left with the same automatic means operating to move and lock the longitudinal position of the cranks. Thus it is apparent that any position of the control lever 88 to the right or left will fix the longitudinal position of the valve gear crank assembly to the left or the right and when the control lever is in the center vertical position, this valve gear assembly will be in midposition or neutral.

It will be apparent from the foregoing description that I have provided a multiple-cylinder steam engine wherein there is a direct and uninterrupted expansion of the steam from the cup-off point on the high-pressure upstroke to the uniflow exhaust on the low-pressure downstroke. The uniflow cycle on the low-pressure cylinder provides an efficient exhaust for handling the large steam volumes at the low vacuum pressures. Passing of the steam through the jacketed cylir.er head between the high-pressure and low-pressure cylinders is thermally favorable on account of the reheating effect on the steam entering the low-pressure cylinder. The opposed construction of the two pistons reduces the maximum bearing load on the head end dead center since at this point the two cylinders are always vented to each other. Only one pressure carrying cylinder head is required for both cylinders giving a double-acting cycle which would require two pressure-carrying cylinder heads on any conventional double-acting design. Both cylinder barrels are extremely simple castings and easy to machine which is far from the case with conventional design marine engines.

The dry lubricating swab, the cooling effect of the vacuum steam on the cylinder walls, the reduction in expansion and compression ratios per cylinder and the comparatively cold piston rod entering the crank case all greatly relieve the lubricating and oil-carbonizing troubles in conventional engines and permit the use of higher steam pressures and temperatures than are now safely used.

The novel valve gear provided is simple, lends itself to enclosed forced-feed lubrication, eliminates largely reciprocating mechanisms, gives accurate steam control throughout the entire range of ahead and astern cut-off adjustments, provides ample port areas, automatic compression relief and initial steam injection for the low-pressure cylinder, all with a single main valve. It also lends itself to oil-pressure actuations from the pressure oiling system on a force-feed lubricated enclosed engine without the conventional reversing engines.

Various changes may be made in the specific embodiment of the present invention without departing from the spirit thereof, or from the scope of the appended claims.

What I claim is:

1. In a multiple cylinder steam engine, in combination, a high-pressure cylinder having an admission and an exhaust port; a low-pressure cylinder having ports for receiving the exhaust steam from said high-pressure cylinder; and a valve interposed between said cylinders for opening the admission port in said high-pressure cylinder for admission of high-pressure steam thereto and for opening both of said ports in said high-pressure cylinder to exhaust steam from said high-pressure cylinder to said low-pressure cylinder.

2. In a multiple cylinder steam engine, in combination, a high-pressure cylinder having an admission and an exhaust port in one end thereof; a low-pressure cylinder having ports for admission of steam from said high-pressure cylinder, and exhaust ports; and a piston valve having circumferential apertures therearound, adapted to open the steam port in said high-pressure cylinder for the admission of high-pressure steam and for opening both of said ports to exhaust steam to said low-pressure cylinder, said apertures being in alignment with said high-pressure admission port when said piston valve is in position to exhaust steam from said high-pressure cylinder to said low-pressure cylinder.

3. In a multiple cylinder steam engine, in combination, a high-pressure cylinder having an admission and an exhaust port in one end thereof; a low-pressure cylinder having ports for admission of exhaust steam from said high-pressure cylinder and exhaust ports; a piston valve adapted to admit the exhaust from both said admission and said exhaust port in said high-pressure cylinder to said low-pressure cylinder; and a piston movable with said piston valve for opening an auxiliary exhaust port to relieve compression in said low-pressure cylinder.

4. In a multiple cylinder steam engine, in combination, a high-pressure cylinder having admission and exhaust ports; a low-pressure cylinder having admission and exhaust ports for receiving exhaust steam from said high-pressure cylinder; a valve disposed between said high-pressure cylinder and said low-pressure cylinder for controlling the admission and exhaust of steam in said high-pressure and low-pressure cylinders; and an auxiliary valve, movable with said first-mentioned valve, for automatically admitting a predetermined amount of high-pressure steam to said low-pressure cylinder upon predetermined movement of said first-mentioned valve.

5. In a multiple cylinder steam engine, in combination, a high-pressure cylinder having admission and exhaust ports; a low-pressure cylinder having admission and exhaust ports for receiving the exhaust steam from said high-pressure cylinder; a piston valve disposed between said high-pressure cylinder and said low-pressure cylinder for controlling the steam events in said cylinders; a poppet valve movable with said piston valve for admitting a predetermined amount of high-pressure steam to said low-pressure cylinder upon long travel of said valve; and an adjustable abutting member for controlling the opening of said poppet valve.

6. In a multiple cylinder steam engine, in combination, a high-pressure cylinder having admission and exhaust ports; a low-pressure cylinder having admission and exhaust ports receiving the exhaust steam from said high-pressure cylinder; a piston valve disposed between said high-pressure cylinder and said low-pressure cylinder for controlling the steam events therein; an auxiliary axially-disposed poppet valve disposed in one end of said piston valve for admitting high-pressure steam to said low-pressure cylinder upon long travel of said piston valve; and an adjustable abutting member in substantially axial alignment with said piston valve for opening said poppet valve upon the long travel of said piston valve.

7. In a multiple cylinder steam engine, in combination, a high-pressure cylinder having admission and exhaust ports; a low-pressure cylinder receiving the exhaust steam from said high-pressure cylinder; a valve for controlling the steam events in said high-pressure and low-pressure cylinders; and a valve gear for controlling the movement of said valve, comprising spaced cylindrical hubs; a crank pin connecting said hubs, adapted to rotate about the axis of said hubs circumscribing a diameter equal to the minimum travel of said valve and in phase with the main crank pin of the engine; a slidable member on said crank pin; and means connected to said slidable member for transmitting movement of said slidable member to said valve, said crank pin being disposed at an angle to vary the diameter circumscribed by said slidable member when it is moved lengthwise on said crank pin.

8. In a multiple cylinder steam engine, in combination, a high-pressure cylinder having admission and exhaust ports, a low-pressure cylinder receiving the exhaust steam from said high-pressure cylinder; a valve for controlling the steam events in said high-pressure and low-pressure cylinders; and a valve gear for controlling the movement of said valve, comprising spaced hubs; a crank pin connecting said hubs spaced from the longitudinal axis thereof, the midpoint on said crank pin circumscribing a predetermined diameter about the longitudinal axis of said hubs, said crank pin passing through and forming acute angles with a plane passing through said longitudinal axis of said hubs; a slidable member movable longitudinally on said crank pin and rotatable therewith; and a connecting member between said slidable member and said valve for transmitting motion therebetween, the throw of said slidable member being increased upon movement away from the midpoint of said crank pin.

9. In a multiple cylinder steam engine, in combination, a high-pressure cylinder having admission and exhaust ports; a low-pressure cylinder for receiving the exhaust steam from said high-pressure cylinder; a valve for controlling the steam events in said high-pressure and low-pressure cylinders; and a valve gear for controlling the movement of said valve comprising spaced hubs; a crank pin connecting said hubs spaced from the axis thereof and rotatable therearound; a slidable member movable longitudinally on said pin and rotatable therewith, said pin being positioned at an angle to a plane passing through the longitudinal axis of said hubs whereby the diameter circumscribed by said slidable member increases upon movement thereof from a point substantially midway between said hubs.

10. In a multiple cylinder steam engine having a high-pressure and a low-pressure cylinder and valve means for controlling steam events in said cylinders, in combination, a valve gear for controlling the movement of said valve means comprising spaced rotatable hubs; a crank pin connecting said hubs spaced from the longitudinal axis thereof and having the midpoint of said crank movable about the axis of said hubs circumscribing a diameter equal to the minimum travel of said valve means, said pin passing through a plane through the longitudinal axis of said hubs; a movable member mounted on said crank pin and rotatable therewith; and connecting means between said movable member and said valve means for transmitting motion therebetween, the outward movement of said movable member increasing by the movement thereof along said crank pin away from the midpoint thereof, thereby increasing the movement of said valve means.

11. In a multiple cylinder steam engine, in combination, a high-pressure cylinder having admission and exhaust ports; a low-pressure cylinder receiving steam from said high-pressure cylinder; a valve for controlling the steam events in said cylinders; and a valve gear for controlling the movement of said valve comprising a crank; a rotatable member on said crank; means for varying the radius of movement of said rotatable member about the longitudinal axis of said crank; and means connecting said rotatable member with said valve for transferring the movement of said rotatable member to said valve.

12. In a multiple cylinder steam engine, in combination, a plurality of high-pressure cylinders having admission and exhaust ports; a plurality of low-pressure cylinders receiving exhaust steam from said high-pressure cylinders; a valve for controlling the steam events in each pair of high and low-pressure cylinders; and a valve gear for controlling the movement of said valves, comprising a plurality of spaced hubs in line; angularly-disposed crank pins connecting each pair of opposed hubs spaced from the longitudinal axis of said hubs and movable therearound; a movable member mounted on said crank pins and rotatable therewith, the radius of movement of said movable members varying upon longitudinal movement thereof on said crank pins; and connecting members between said slidable members and each of said valves for transmitting motion therebetween.

13. A multiple cylinder steam engine, as set forth in claim 12, wherein means are provided for moving said crank longitudinally.

14. In a multiple cylinder steam engine, in combination, a high-pressure cylinder having admission and exhaust ports; a low-pressure cylinder receiving steam from said high-pressure cylinder; a valve controlling the steam events in said cylinders; a valve gear casing; a valve gear for controlling the movement of said steam valves disposed in said casing, comprising opposed hubs; an angularly-disposed pin spaced from the longitudinal axis of said hubs, the midpoint of said pin circumscribing a circle around the longitudinal axis of said hubs equal to the minimum valve travel of said steam valve; a movable member on said pin rotatable therewith; a connecting member between said movable member and steam valve for transmitting motion therebetween, the diameter circumscribed by said movable member on said pin increasing upon longitudinal movement thereof in either direction away from the midpoint of the crank pin; and hydraulic means for moving said crank longitudinally.

15. In a multiple cylinder steam engine, in combination, high-pressure cylinders having admission and exhaust ports; low-pressure cylinders receiving steam from said high-pressure cylinders; valves for controlling the steam events in said cylinders; and an enclosed valve gear comprising a plurality of opposed spaced hubs connected together by angularly-disposed pins; members connecting said hubs together; slidable members on said pins rotatable therewith, the radius of rotation of said slidable member about the longitudinal axis of said hubs increasing or decreasing upon movement along said pins; means for moving said hubs longitudinally; and means connecting said slidable member and said valve for transmitting motion therebetween.

16. In a multiple cylinder steam engine, as set forth in claim 15, wherein a plate member is disposed between the outer sides of opposed hub members forming oil chambers on each side of said plate member, and selective control means to admit oil under pressure into either of said chambers to move said crank longitudinally in said enclosed casing.

17. In a multiple cylinder steam engine, in combination, a single-acting high-pressure cylinder; a low-pressure cylinder of the single-acting uniflow type; pistons in said high-pressure and low-pressure cylinders; a piston rod whereon said pistons are mounted; a valve for controlling the steam events in said high-pressure and low-pressure cylinders; and swab members movable with said pistons on the low-pressure sides thereof.

18. In a multiple cylinder steam engine, in combination, high-pressure cylinders; low-pressure cylinders of the single-acting uniflow type disposed below said high-pressure cylinders; pistons in said high and low-pressure cylinders; piston rods whereon said pistons are mounted in each pair of high and low-pressure cylinders; valve means for controlling the steam events in said cylinders; and a valve gear for controlling the movement of said valve comprising rotatable cranks; angularly disposed pins on said cranks; movable members disposed on said pins; means for transmitting the movement of the said movable members to said valve means; and means for moving said cranks longitudinally, said pins being so disposed angularly that the longitudinal movement of said cranks will vary the radius of movement of said movable member on said pins to vary the movement of said valve means.

19. In a multiple cylinder steam engine, in combination, a high-pressure cylinder of the counterflow type; a low-pressure cylinder of the single-acting uniflow type; pistons in said high-pressure and low-pressure cylinders; a piston rod whereon said pistons are mounted; valve means for controlling the steam events in said cylinders; and an adjustable auxiliary valve movable with said first-mentioned valve means for initially admitting high-pressure steam to said low-pressure cylinder automatically upon predetermined movement of said first-mentioned valve means.

20. In a multiple cylinder steam engine, in combination, a high-pressure cylinder; a low-pressure cylinder of the single-acting uniflow type; a valve for controlling the steam events in said cylinders; and a valve gear for operating said valve, comprising a rotatable crank; members movable with said crank about the axis thereof; connecting means between said members and said valve for transmitting motion therebetween; and means for increasing or decreasing the radius of movement of said members.

21. In a multiple cylinder steam engine, in combination, a high-pressure cylinder; a low-pressure cylinder of the single-acting uniflow type; pistons in said high-pressure and low-pressure cylinders; a piston rod upon which said pistons are mounted; a valve for controlling the steam events in said cylinder; and a comparatively large exhaust steam line vented to the opposite outer ends of said cylinders below atmospheric pressure.

22. In a multiple cylinder steam engine, in combination, a high-pressure cylinder having admission and exhaust ports; a low-pressure cylinder of the single-acting uniflow type having an auxiliary exhaust port; a piston valve which controls the steam admittance to said high-pressure cylinder and exhaust from said high-pressure cylinder to said low-pressure cylinder; and a cylinder movable with said piston valve which opens and closes said auxiliary exhaust port in said low-pressure cylinder to relieve compression therein; and a poppet valve in said cylinder for admitting high-pressure steam automatically to said low-pressure cylinder upon long travel of said valve.

23. In a multiple cylinder steam engine, having a high-pressure cylinder and a low-pressure cylinder and a valve for controlling the steam events in said cylinders; in combination, an enclosed rotatable valve gear for operating said valve; and means for moving said valve gear longitudinally, comprising two fluid chambers disposed centrally of said valve gear; selective valve means for admitting fluid to said chambers; a valve rod for operating said valve means; a control lever; a pivoted link on said control lever connected to said valve rod; and means for automatically returning said valve means to a closed position to lock said valve gear in a predetermined position.

24. In a multiple cylinder steam engine, as set forth in claim 23, wherein the means for returning the oil valve to a closed position comprises a rack on said rotatable valve gear; a toothed arcuate formed rocker; pinions engaging said rack and said rocker; and a reach rod connecting said rocker and said link on the control lever, the longitudinal movement of said rotatable member moving said link through gear and rock engagement to close said valve means through the valve rod connected to said link.

25. In a multiple cylinder steam engine, having high and low-pressure cylinders, a valve for controlling the steam events therein, and a rotatable valve gear for operating said valve, in combination, means for moving said valve gear longitudinally and automatically locking it in a predetermined position, comprising opposed fluid cylinders; selective valve means for admitting and exhausting fluid to and from said cylinders; a valve rod; a pivoted link to which said valve rod is connected; a control lever on which said link is mounted; a reach rod connected substantially at the midpoint of said link; and means engaging said valve gear to automatically move said reach rod upon movement of said valve gear, said reach rod moving said valve rod attached to said link to move said valve means to a closed and locked position.

26. In a multiple cylinder steam engine, as set forth in claim 25, wherein a handwheel is provided to move said valve gear manually, and means are further provided to drain the fluid from said fluid chambers and shut-off the source of fluid leading thereto when said handwheel is utilized.

27. In a multiple cylinder steam engine having a high and a low-pressure cylinder and a valve for controlling the steam events in said cylinders, in combination, a valve gear comprising opposed hubs; an angularly disposed pin connecting said hubs, movable about the axis of said hubs; a movable member mounted on said pin; a strap member engaging said movable member; a thrust member for maintaining said strap in a vertical position; and means connecting said strap and said valve for transmitting motion therebetween.

28. In a multiple expansion engine, as set forth in claim 27, wherein said thrust member comprises opposed vertically-disposed plates, and a slidable member movable between said plates attached to said strap member.

HERMAN G. MUELLER.